(12) United States Patent
Mehn et al.

(10) Patent No.: US 8,604,386 B2
(45) Date of Patent: Dec. 10, 2013

(54) WELDING WIRE FEEDING SYSTEMS AND METHODS

(75) Inventors: Peter Donald Mehn, Oshkosh, WI (US); Brandon John Speilman, Kaukauna, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 159 days.

(21) Appl. No.: 13/024,048

(22) Filed: Feb. 9, 2011

(65) Prior Publication Data

US 2011/0220629 A1  Sep. 15, 2011

Related U.S. Application Data

(60) Provisional application No. 61/312,492, filed on Mar. 10, 2010.

(51) Int. Cl.
*B23K 9/00* (2006.01)

(52) U.S. Cl.
USPC .......................................................... 219/136

(58) Field of Classification Search
USPC ....................... 219/130, 136, 137, 121, 54, 61
See application file for complete search history.

(56) References Cited

U.S. PATENT DOCUMENTS

| 3,586,221 | A | 6/1971 | Rosen |
| 3,586,222 | A | 6/1971 | Rosen |
| 5,386,221 | A | 1/1995 | Allen et al. |
| 5,935,458 | A | 8/1999 | Trapani et al. |
| 6,568,578 | B1 * | 5/2003 | Kensrue ........................ 226/176 |
| 2007/0164074 | A1 | 7/2007 | Schorghuber et al. |
| 2008/0061045 | A1 * | 3/2008 | Eldridge ..................... 219/130.1 |
| 2008/0257874 | A1 * | 10/2008 | Kaufman et al. ......... 219/137 R |
| 2011/0024048 | A1 | 2/2011 | Nakamura |

FOREIGN PATENT DOCUMENTS

JP  58053376 A  3/1983

OTHER PUBLICATIONS

International Search Report application No. PCT/US2011/027374 mailed Jun. 21, 2011.

* cited by examiner

*Primary Examiner* — Henry Yuen
*Assistant Examiner* — Michael LaFlame, Jr.
(74) *Attorney, Agent, or Firm* — Fletcher Yoder, P.C.

(57) ABSTRACT

Welding wire feed systems include a wire feeder including a push motor and a welding torch assembly including a pull motor are provided. The push motor is adapted to establish a wire feed from a wire spool, and a first controller is adapted to receive a commanded speed level and to control operation of the push motor to operate at the commanded speed level. The pull motor is adapted to cooperate with the push motor to establish a desired wire feed rate from the wire spool to the welding torch assembly. A second controller is adapted to receive an operational speed level of the push motor from the first controller and to control operation of the pull motor to operate at the received operational speed of the push motor.

13 Claims, 5 Drawing Sheets

FIG. 5

WELDING WIRE FEEDING SYSTEMS AND METHODS

CROSS REFERENCE TO RELATED APPLICATIONS

This application is a Non-Provisional Patent Application of U.S. Provisional Patent Application No. 61/312,492, entitled "Multi-Motor Speed Linkage", filed Mar. 10, 2010, which is herein incorporated by reference.

BACKGROUND

The invention relates generally to welding systems, and, more particularly, to welding wire feeding systems including motor synchronization.

Welding is a process that has become increasingly ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeding system to ensure that a proper wire feed reaches a welding torch. Some such wire feeding systems rely on a push-pull system in which a push motor and a pull motor cooperate to both pull the wire from a wire spool and push the wire toward a welding torch at a desired wire feed rate.

In such push-pull wire feeding systems, the push motor and the pull motor each operate a separate drive mechanism, which may include components such as drive rollers, gears, etc., in contact with a single wire at different points along the length of the wire. As such, it is desirable that operation of the push motor and the pull motor be coordinated such that a consistent wire feed rate is maintained. Unfortunately, in many traditional systems, a mismatch in wire delivery rate between the two separate drive mechanisms may lead to deformation of the welding electrode, which may result in a less than optimal welding arc quality. Such a delivery rate mismatch may occur, for example, due to variations in motor speed of the push motor and the pull motor during operation. Accordingly, there exists a need for improved welding wire feed systems that overcome such drawbacks.

BRIEF DESCRIPTION

In an exemplary embodiment, a welding wire feed system includes a wire feeder including a push motor adapted to establish a wire feed from a wire spool and a first controller adapted to receive a commanded speed level and to control operation of the push motor to operate at the commanded speed level. The welding wire feed system also includes a welding torch assembly including a pull motor adapted to cooperate with the push motor to establish a desired wire feed rate from the wire spool to the welding torch assembly and a second controller adapted to receive an operational speed level of the push motor from the first controller and to control operation of the pull motor to operate at the received operational speed of the push motor.

In another exemplary embodiment, a welding wire feed system includes a welding wire feeder including a drive assembly. The wire drive assembly includes a push motor adapted to power rotation of at least one drive roller to unspool wire from a wire spool and a first controller coupled to the push motor and adapted to control operation of the push motor to maintain a speed level of the push motor at a commanded speed level by receiving feedback from a speed sensor and a current sensor each coupled to the push motor and adapted to measure a rotational speed of the push motor or of a component coupled to the motor, and a current level of the push motor, respectively. The welding wire feed system also includes a welding torch assembly including a pull motor adapted to power rotation of at least one additional drive roller to establish a desired wire feed rate from the wire spool to the welding torch assembly and a second controller coupled to the pull motor and adapted to receive an operational speed level of the push motor from the first controller and to control operation of the pull motor to maintain a speed level of the pull motor approximately equal to the operational speed level of the push motor.

In a further embodiment, a welding wire feed system includes a first wire drive assembly including a first motor coupled to at least one drive roller and adapted to draw wire from a wire spool. The welding wire feed system also includes a second wire drive assembly including a second motor coupled to at least one additional drive roller and adapted to cooperate with the first wire drive assembly to establish a desired wire feed rate from the wire spool toward a welding device. The welding wire feed system also includes a controller adapted to regulate an operational speed of the first motor and an operational speed of the second motor to cooperatively control operation of the first wire drive assembly and the second wire drive assembly. The controller is further adapted to receive feedback regarding an operational rotational speed of one of the first motor or the second motor and to utilize the received speed feedback as a commanded speed for the other of the first motor or the second motor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of wire feeding systems capable of matching a rotational speed of a first motor associated with a first wire drive assembly and a rotational speed of a second motor associated with a second wire drive assembly are provided. For example, in one embodiment a push-pull wire feeding system including a push motor and a pull motor may include a controller configured to synchronize the speed of the push motor and the speed of the pull motor. For further example, in such a system, the controller may monitor an operational speed of the push motor or of a component coupled to the motor, and utilize this operational speed as the input command speed for the pull motor. Still further, in other embodiments, the controller may monitor and utilize feedback regarding the operational speed of the pull motor as the input command speed for the push motor.

Further, in some embodiments, a wire feed system controller may monitor the current level, which is indicative of motor torque, and the operational speed of one or both of the motors. Such feedback may be utilized to regulate motor torque by altering motor current to exhibit control over the motor speed of the regulated motor. Further, since one motor of the system may be a higher torque motor (e.g., the push motor in the wire feeder) than another motor of the system (e.g., the pull motor in the welding torch assembly), the controller may be adapted to synchronize the speed of the lower torque motor with that of the higher torque motor at a relatively small time interval while limiting the amount of torque applied to the welding wire being fed through the welding system from the wire spool to the welding torch. The foregoing feature may offer the advantages of reducing or eliminating wire deformation as compared to traditional push-pull wire feeding systems.

Figure 1:
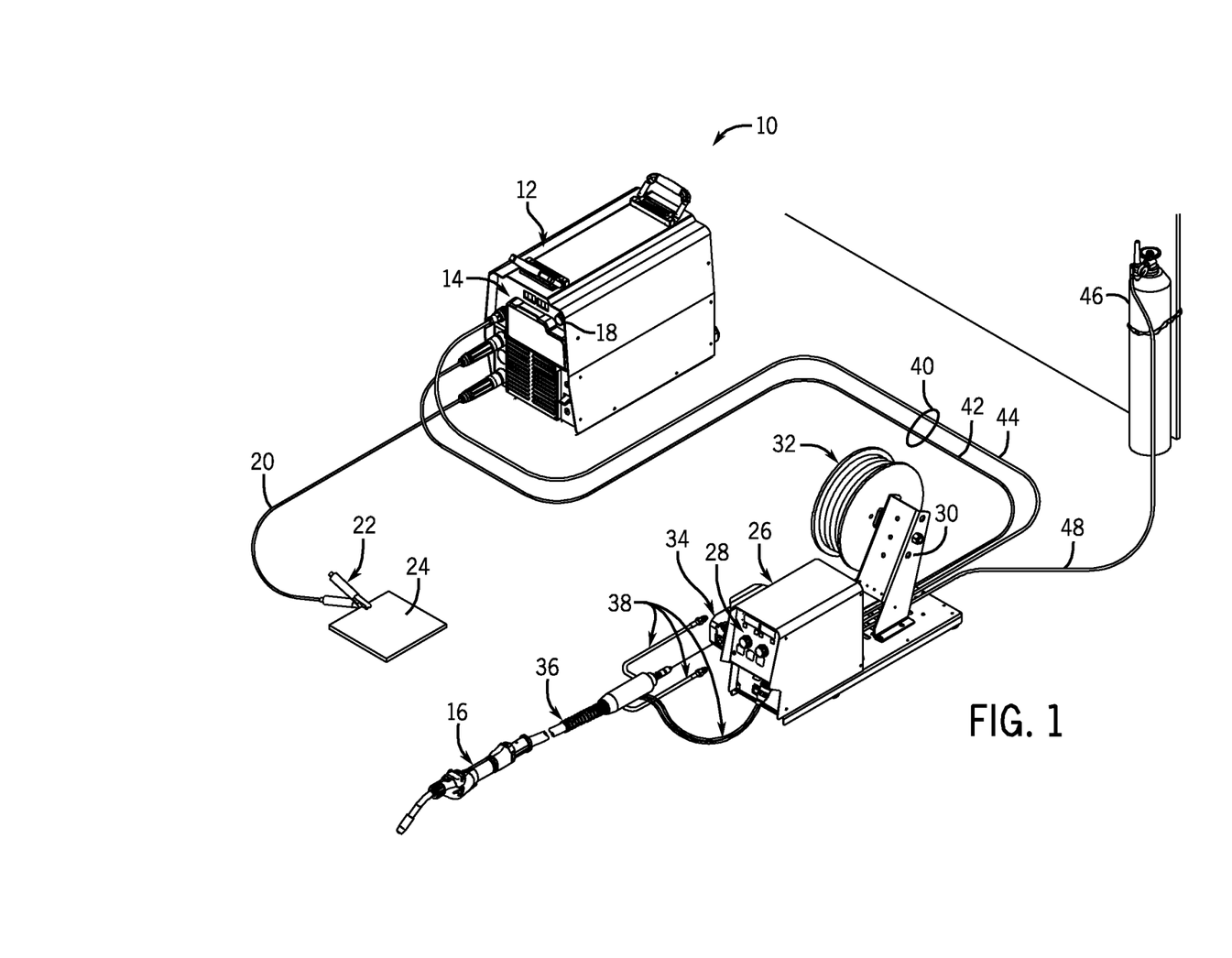
FIG. 1 illustrates an exemplary welding system that powers, controls, and provides supplies to a welding operation.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as gas flow, wire feed, and so forth, to a welding torch 16. To that end, the control panel 14 includes input or interface devices, such as knob 18 that the operator may use to adjust welding parameters (e.g., voltage, current, etc.). A work lead 20 couples the welder 12 to a work clamp 22 that connects to a workpiece 24 to complete the circuit between the welder 12 and the welding torch 16 during a welding operation.

The illustrated welding system 10 also includes a bench style wire feeder 26 that provides welding wire to the welding torch 16 for use in the welding operation. To that end, the wire feeder 26 of the illustrated embodiment includes a control panel 28 that allows the user to set one or more wire feed parameters, such as wire feed speed. The wire feeder 26 of the illustrated embodiment further includes a mounting structure 30 that is adapted to receive a wire spool 32. Additionally, the wire feeder 26 includes a wire feed drive assembly 34 configured to unspool the wire from the wire spool 32 to establish a feed of wire to the welding torch 16. The wire feeder 26 and the wire feed drive assembly 34 may house a variety of internal components, such as a motor, one or more drive rollers, and so forth, configured to cooperate to unspool the wire from the wire spool 32 in the desired manner as appropriate for the given operation. For example, in one embodiment, the wire feeder 26 may house a push motor coupled, for example, to a current sensor and/or a speed sensor in the wire feed drive assembly 34. Further, such embodiments may include a controller disposed therein and coupled to the push motor and to the one or more sensors. The controller may be configured to monitor the detected current and/or speed and to alter one or more control parameters of the motor to maintain an operating speed of the push motor at a substantially fixed value determined by a received input command, as described in more detail below.

It should be noted that although the wire feeder 26 shown in the embodiment of FIG. 1 is a bench style feeder, in other embodiments, the wire feeder 26 may be any suitable wire feeder systems, such as any of a variety of push-pull wire feeder systems, configured to utilize two or more motors to establish a wire feed to a welding torch. Indeed, embodiments of the present invention may be utilized in conjunction with motors of bench style feeders and/or non-bench style feeders, such as boom mounted style feeders and portable, suitcase-style wire feeders. Such wire feeders may be used with any wire feeding process, such as gas operations (gas metal arc welding (GMAW)) or gasless operations (shielded metal arc welding (SMAW)). For example, the wire feeders may be used in metal inert gas (MIG) welding or stick welding. Indeed, embodiments of the present invention include any welding wire feeder having two or more wire feed motors in which an operational speed of one of the motors is utilized as the speed command of the other wire feed motors, as described in more detail below.

In the illustrated embodiment, a variety of cables couple the components of the welding system 10 together and facilitate the supply of welding materials to the welding torch 16. A first cable 36, which may branch off into a variety of individual leads 38, couples the welding torch 16 to the wire feeder 26. A bundle 40 of cables couples the welder 12 to the wire feeder 26 and provides weld materials for use in the welding operation. The bundle 40 includes a power lead 42 and a control cable 44. It should be noted that the bundle 40 of cables may not be bundled together in some embodiments and/or may include additional data, power, or other suitable leads. Further, a gas cylinder 46, which is the source of the gas that supplies the welding torch 16, is coupled to the wire feeder 26 via gas conduit 48.

During operation of embodiments of the present invention, the components of the welding system 10 may cooperate to feed welding wire to the welding operation via the welding torch 16 via a push-pull feed system. To that end, in such embodiments, the welding torch 16 may house a pull motor configured to establish a wire feed rate to the welding operation, and the welding wire feeder 26 may house a push motor configured to draw the desired amount of wire from the welding spool 32 while maintaining an appropriate wire tension between the pull motor and the push motor. As such, the pull motor and the push motor may cooperate to maintain the desired wire feed from the wire spool 32 to the welding operation via the welding torch 16. To that end, as disclosed herein, the motors may be controlled by a single controller or by two respective controllers that synchronize the speed of the push motor and the pull motor. That is, feedback regarding the operational speed of one of the motors may be utilized as the speed command for the other motor. In such a way, the wire feed rate may be controlled by synchronizing the speeds of the motors. Further, such a feature may reduce or prevent the likelihood of the welding electrode being deformed during the wire feeding process due to variations in motor operation, as described in more detail below.

Figure 2:
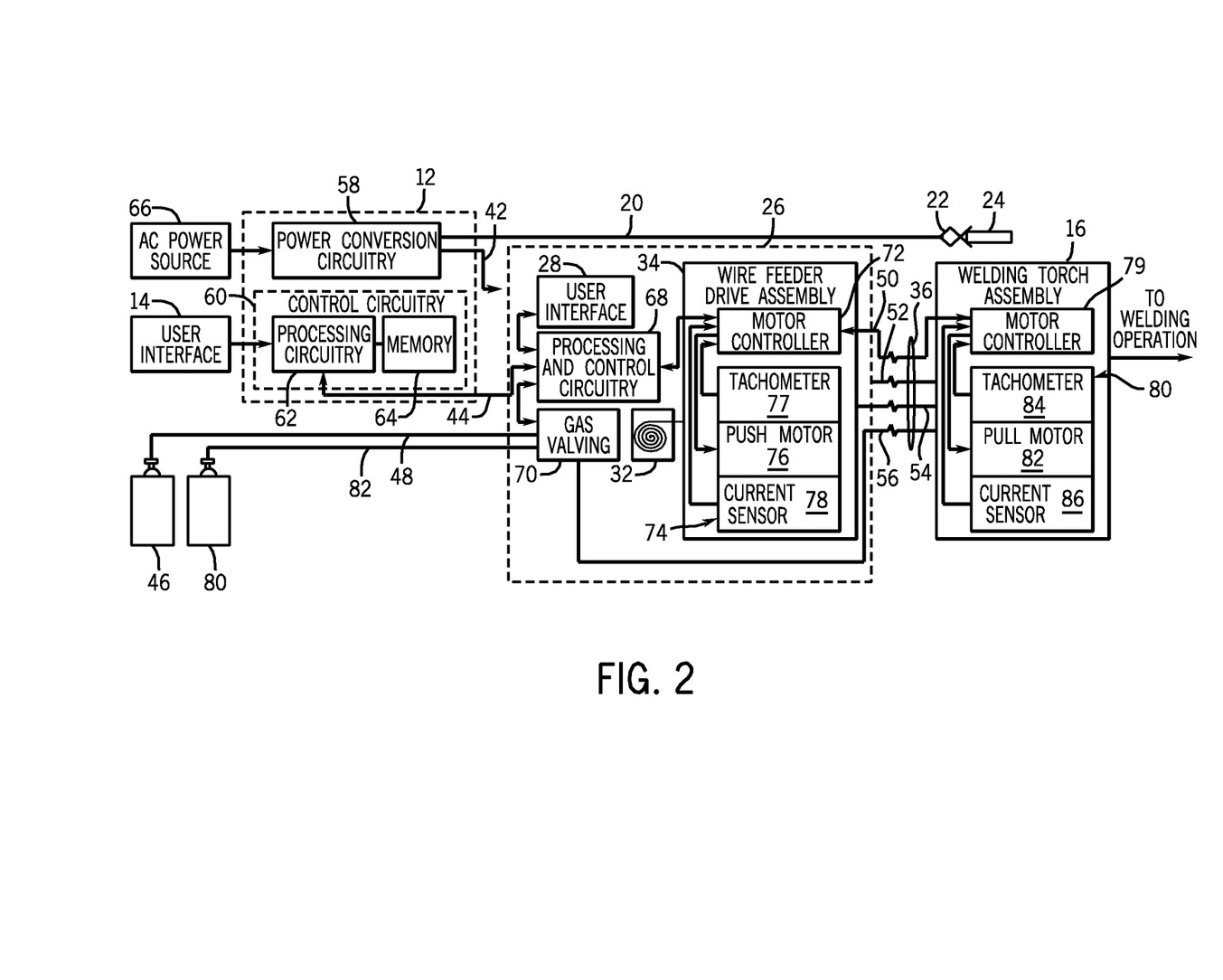
FIG. 2 is a block diagram illustrating components of an exemplary welding power supply and an exemplary welding torch assembly.

FIG. 2 is a block diagram illustrating internal components of the welder 12, the wire feeder 26, and the welding torch assembly 16 in accordance with an embodiment of the present invention. However, it should be noted that modifications to the illustrated system may be made in additional embodiments, and the illustrated embodiment is not meant to limit the system components. As before, the welder 12 and the wire feeder 26 are coupled to one another via power cable 42 and data cable 44, and the welding torch 16 is coupled to the wire feeder 26 via the bundle of cables 36. In the embodiment of FIG. 2, the bundle of cables 36 coupling the wire feeder 26 to the welding torch assembly 16 includes a data cable 50, a power cable 52, a wire feed lead 54, and a gas conduit 56.

In the illustrated embodiment, the welder 12 includes power conversion circuitry 58 and control circuitry 60. The control circuitry 60 includes processing circuitry 62 and associated memory 64. As illustrated, the processing circuitry 62 of the welder 12 interfaces with the operator interface 14 that allows for data settings to be selected by the operator. The operator interface 14 may allow for selection of settings such as the weld process, the type of wire to be used, voltage and current settings, and so forth. In particular, the system is designed to allow for MIG welding with aluminum or other welding wire that is both pushed towards the welding torch 16 and pulled through the torch 16 by a push motor and a pull motor, respectively.

During operation, the control circuitry 60 operates to control generation of welding power output that is applied to the welding wire for carrying out the desired welding operation. To that end, the control circuitry 60 is coupled to power conversion circuitry 58. The power conversion circuitry 58 is adapted to create the output power that will ultimately be applied to the welding wire at the welding torch 16. Various power conversion circuits may be employed, including choppers, boost circuitry, buck circuitry, inverters, converters, and so forth. The configuration of such circuitry may be of types generally known in the art. The power conversion circuitry 58 is coupled to a source of electrical power, for example AC power source 66. The power applied to the power conversion circuitry 58 may originate in the power grid, although other sources of power may also be used, such as power generated by an engine-driven generator, batteries, fuel cells or other alternative sources. Accordingly, when operated, the power conversion circuitry 58 and the control circuitry 60 of the welder 12 are configured to output power and data via cables 42 and 44, respectively, to the wire feeder 26 to control and power the welding operation at the welding torch 16.

The illustrated wire feeder 26 includes the user interface 28, processing and control circuitry 68, gas valving 70, the wire spool 32, and the wire feeder drive assembly 34. The wire feeder drive assembly 34 includes but is not limited to a motor controller 72 and a motor assembly 74. The motor assembly 74 includes a push motor 76, a tachometer 77, and a current sensor 78. The gas valving 70 is coupled to the first gas cylinder 46 via gas conduit 48 and to a second gas cylinder 80 via a second gas conduit 82.

During operation, the control circuitry 68 allows for wire feed speeds to be controlled in accordance with operator selections indicated via the user interface 28 and permits these settings to be fed back to the processing circuitry 62 of the power supply 12 via data conduit 44. For example, the operator interface 28 may allow for selection of such weld parameters as the process, the type of wire utilized, current, voltage or power settings, and so forth. The operator interface 28 may also allow the operator to choose a type of gas desired for the given application or the processing circuitry 68 may determine an appropriate gas type based on one or more operator selections. To that end, the control circuitry 68 is also coupled to the gas control valving 70, which regulates the flow of shielding gas to the welding torch 16 in accordance with the selections chosen by the operator. In general, such gas is provided at the time of welding and may be turned on immediately preceding the weld and for a short time following the weld.

The control circuitry 68 of the wire feeder 26 also controls components of the wire feeder drive assembly 34 that operate to feed wire to the welding torch 16. For example, in some embodiments, the feed of wire from the spool of welding wire 32 housed in the wire feeder 26 to the welding torch 16 may be controlled by the control circuitry 68 in conjunction with the motor controller 72. However, although in the illustrated embodiment, control circuitry 68 and motor controller 72 are illustrated as distinct components, in other embodiments, a single control circuit may be provided to coordinate operation of the wire feeder components. For instance, in one embodiment, the motor controller 72 may be integrated into the main control circuitry 68. Indeed, any of a variety of suitable control circuits may be utilized in the wire feeder 26 to implement the desired wire feed.

To establish a wire feed from the wire spool 32 to the welding torch 16, welding wire is unspooled from the spool 32 and is progressively fed to the torch 16 at a desired speed as established by the push motor 76. For example, the push motor 76 may engage with feed rollers to push wire from the wire feeder 26 towards the torch 16. In practice, one of the wire feed rollers is mechanically coupled to the push motor 76 and is rotated by the motor 76 to drive the wire from the wire feeder 26, while the mating roller is biased towards the wire to maintain good contact between the two rollers and the wire. Some systems may include multiple rollers of this type.

Such a wire feed process is controlled by the motor controller 72, which exhibits control over one or more operating parameters of the push motor 76. In accordance with embodiments of the present invention, the tachometer 77 is operated either continuously or periodically at desired intervals to measure the operational rotational speed of a shaft of the push motor 76 throughout its operation and to provide such feedback to the motor controller 72. Similarly, the current sensor 78 is also operated continuously or at predetermined time intervals to measure a current level of the push motor 76 and to provide such feedback to the motor controller 72. The motor controller 72 may utilize the received feedback from the sensors 77 and 78 in conjunction with a commanded speed determined, for example, via parameters received via interface 28 to regulate a speed of the push motor 76. For example, in one embodiment, the motor controller 72 may utilize such feedback to adjust motor torque to regulate the motor speed in accordance with the commanded speed level. The operational speed of the push motor 76 may then be communicated to a controller capable of controlling an associated pull motor for utilization as the commanded speed level of the pull motor, as described in detail below.

In the illustrated embodiment, the wire feeder 26 is coupled to the welding torch assembly 16 via the bundle of cables 36 including the data lead 50, the power lead 52, the wire cable 54, and the gas conduit 56. The welding torch assembly 16 includes but is not limited to a motor controller 79 and a motor assembly 80 including a pull motor 82, a tachometer 84, and a current sensor 86. During operation, the pull motor 82 operates one or more drive rolls to establish and maintain a desired wire feed rate, for example, as selected by an operator on interface 28 located on the wire feeder 26. Operation of the pull motor 82 may be controlled in any of a variety of suitable ways. For example, the motor controller 72, alone or in conjunction with control circuitry 68 and/or controller 72, may utilize motor speed feedback from sensor 84 and/or current feedback from sensor 86 to control operation of the pull motor 82. For instance, the controller 72 may control the speed of the motor 82 to match the operational speed of the push motor 76 to maintain a substantially uniform push-pull wire feed to the welding operation. That is, in some embodiments, the operational speed of the push motor 76 may be the commanded speed of the pull motor 82. Still further, in other embodiments, the operational speed of the pull motor 82 may be the commanded speed of the push motor 76. Such synchronization of the speeds of the push motor 76 and the pull motor 82 are described in more detail below. It should be noted that, throughout the various embodiments disclosed herein, where reference is made to the speed of one or both motors, this parameter may refer to the actual rotational speed of the motor, or to the speed of a component coupled to the motor (e.g., a gear box, a drive roller, etc.). Thus, references to sensing speed of one or both motors should be understood to include measurement of the actual rotor or shaft speed of the motor or motors, or to components coupled to them. Similarly, references to synchronizing speeds should be understood to mean synchronization of drive speeds of the welding wire, the actual speeds of the motors being converted, in some implementations, by gear reducers, roller dimensions, and so forth.

Figure 3:
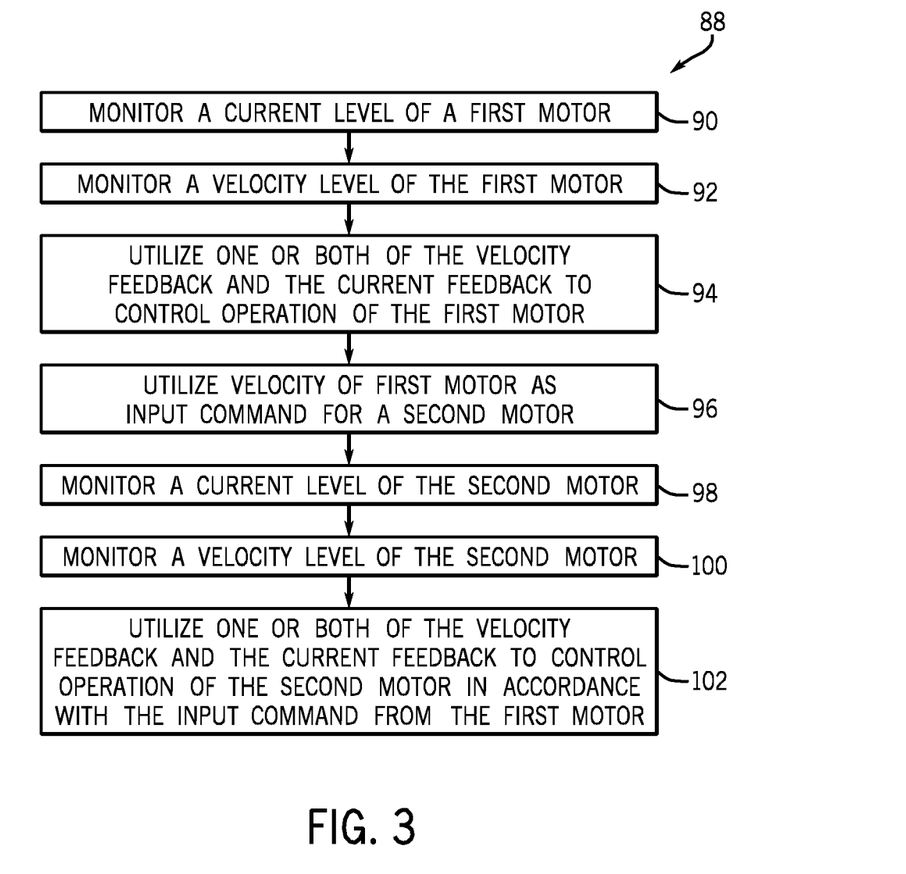
FIG. 3 is a block diagram illustrating an embodiment of a method that may be utilized to control operation of the welding system of FIGS. 1 and 2.

FIG. 3 illustrates an embodiment of a method 88 that may be utilized by embodiments of the presently disclosed controllers to synchronize operation of the push motor and the pull motor to establish a desired wire feed rate. The method 88 includes monitoring a current level of a first motor (block 90) and monitoring a speed level of the first motor (block 92). For example, in a push-pull wire feeding system, as described above, the first motor may be a push motor associated with a wire drive assembly in a wire feeder. The method 88 also includes utilizing one or both of the speed feedback and the current feedback to control operation of the first motor (block 94). That is, during operation, the controller may monitor feedback from the speed sensor and/or the current sensor at predetermined time intervals and may utilize such feedback to correct one or more operational parameters of the wire drive assembly to maintain the speed of the motor at a commanded level. For example, in one embodiment, by utilizing the current feedback to control the motor current level, the motor torque may be regulated by the controller. As such, in certain embodiments, the controller may be configured to monitor motor speed to command motor torque to correct a speed error between the detected speed and the commanded speed.

The method 88 also includes utilizing the speed of the first motor as an input command for a second motor (block 96). For example, the speed of the push motor may be utilized as the commanded speed for the pull motor, or vice versa, if desired. However, it should be noted that any suitable motor speed may be utilized as the commanded speed for one or more additional motors in the wire feed system. For example, in some embodiments, the controller may adjust motor torque to regulate motor speed. As such, in some embodiments, it may be desirable for the speed of the higher inertia motor (e.g., a motor in the wire feeder) to be the commanded speed level for the lower inertia motor (e.g., a motor in the welding torch).

The method 88 further includes the step of monitoring a current level and a speed level of the second motor (blocks 98 and 100), for example, to adjust the torque of the second motor to regulate the speed of the second motor to the commanded level. The method further includes utilizing the speed feedback and/or the current feedback to control operation of the second motor in accordance with the input speed command from the first motor (block 102). That is, the controller regulates the speed of the second motor to the operational speed of the first motor such that the motor speeds are synchronized during operation. In such a way, embodiments of the present invention may provide for the first motor and the second motor feeding the wire at substantially the same rate. The foregoing feature may have the effect of reducing or eliminating wire deformation due to a mismatched delivery rate during wire feeding.

Figure 4:
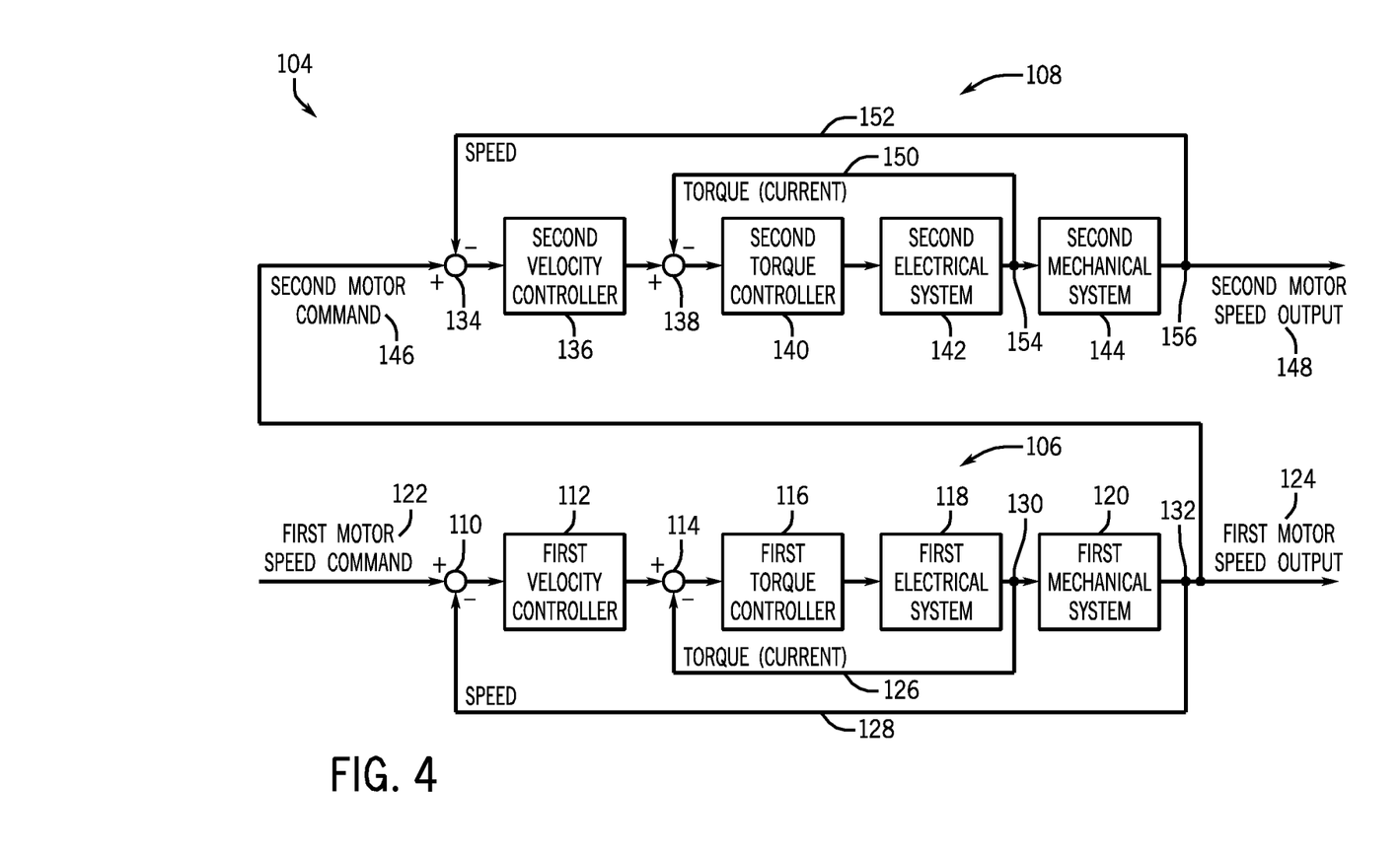
FIG. 4 is an embodiment of a control diagram illustrating one or more feedback loops that may be utilized by a controller of the welding system of FIG. 1.

FIG. 4 is a control diagram 104 illustrating exemplary control loops that may be utilized to coordinate control of a first motor assembly 106 and a second motor assembly 108. As illustrated, the first motor assembly 106 includes a speed feedback point 110, a first speed controller 112, a torque feedback point 114, a first torque controller 116, a first electrical system 118, and a first mechanical system 120. During operation, the first motor assembly 106 receives a first motor speed command 122 and produces a first motor speed output 124. To that end, the assembly 106 includes a current feedback loop 126 and a speed feedback loop 128 coupled to a current sensor 130 and a speed sensor 132, respectively.

Similarly, the second motor assembly 108 includes a speed feedback point 134, a second speed controller 136, a torque feedback point 138, a second torque controller 140, a second electrical system 142, and a second mechanical system 144. During operation, the second motor assembly 108 receives a second motor speed command 146 that is substantially equal to the operational speed of the first motor and produces a second motor speed output 148. To that end, the assembly 108 includes a current feedback loop 150 and a speed feedback loop 152 coupled to a current sensor 154 and a speed sensor 156, respectively.

During operation, the first electrical system 118 outputs a current that is measured by the current sensor 130 and fed back to the first torque controller 116 via input point 114. The first torque controller 116 is configured to regulate output torque of the motor by regulating motor current. For example, the first torque controller 116 may regulate the motor torque to a substantially constant level for a predetermined time interval. Concurrently, the first mechanical system 120, which may include a first motor having a rotating shaft, rotates at a given speed to produce the first motor speed output 124. The operational rotational speed of the system 120 is measured by speed sensor 132 and communicated back to the first speed controller 112 via point 110. The first speed controller 112 receives the operational speed feedback, compares such feedback to the first motor speed command 122, and alters one or more operational parameters or commands if necessary to substantially match the operational motor speed to the motor speed command 122.

In such a way, the first motor assembly 106 monitors a speed level of the first motor (as detected by sensor 132) to command a motor torque level to correct a speed error between the actual operational speed and the commanded speed. In such a way, the first motor speed may be continuously or periodically corrected throughout operation to reduce or eliminate a difference between the commanded speed and the operational speed. To that end, the current feedback loop 126 and the speed feedback loop 128 may be operated at substantially different time intervals as desired. For example, in one embodiment, the speed loop 128 may provide feedback approximately every 2 ms, and the current loop 126 may provide feedback approximately every 100 μs. For further example, in some embodiments, for every one speed change, there may be approximately twenty current feedback points. Indeed, feedback from each of the loops may be fed back at any desirable time intervals.

As the first motor assembly 106 operates to produce the first motor speed output 124, the second motor assembly 108 receives feedback from the first motor assembly 106 regarding the operational speed of the first motor. In this way, the operating speed of the first motor is the commanded speed for the second motor. That is, the first motor speed output 124 is the second motor speed command 146. In such a way, differences between the first motor speed output 124 and the second motor speed output 148 may be reduced or eliminated as compared to traditional systems, thus leading to a substantially constant wire feed rate at the first wire drive assembly and the second wire drive assembly.

Similar to operation of the first motor assembly 106, after receiving the second motor command 146 from the first assembly 106, the second motor assembly 108 operates to substantially reduce an error between the commanded motor speed 146 and the output motor speed 148. To that end, the second electrical system 142 outputs a current that is measured by the current sensor 154 and fed back to the second torque controller 140 via input point 138. The second torque controller 140 is configured to regulate output torque of the motor by regulating motor current. For example, the second torque controller 140 may regulate the motor torque to a substantially constant level for a predetermined time interval.

Concurrently, the second mechanical system 144, which may include a second motor having a second rotating shaft, rotates at a given speed to produce the second motor speed output 148. The operational rotational speed of the system 144 is measured by speed sensor 156 and communicated back to the second speed controller 136 via point 134. The second speed controller 136 receives the operational speed feedback, compares such feedback to the second motor speed command 146, and alters one or more operational parameters or commands if necessary to substantially match the operational motor speed to the motor speed command 146. In such a way, the controller 136 operates to match the operational speed of the second motor to the operational speed of the first motor, thus substantially synchronizing the operation of the two motors in the wire feeding system.

In such a way, the second motor assembly 108 monitors a speed level of the second motor (as detected by sensor 156) to command a motor torque level to correct a speed error between the actual operational speed of the second motor and the commanded speed of the second motor, which is equal to the operational speed of the first motor. In such a way, the second motor speed may be continuously or periodically corrected throughout operation to reduce or eliminate a difference between the commanded speed and the operational speed as well as to reduce or eliminate a difference between the second motor speed output 148 and the first motor speed output 124. To that end, as before, the current feedback loop 150 and the speed feedback loop 152 may be operated at substantially different time intervals as suitable for the given operation.

Figure 5:
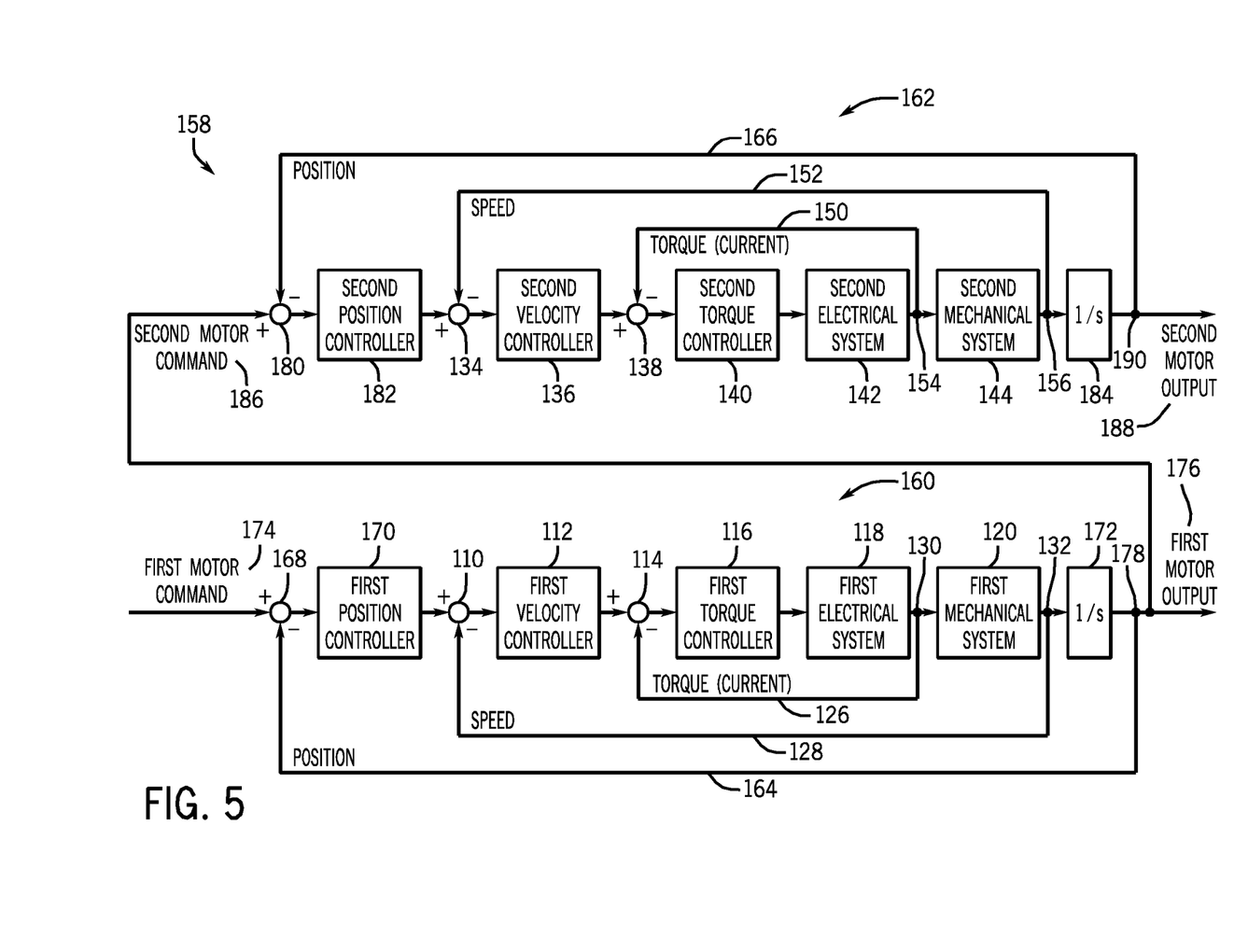
FIG. 5 is an embodiment of an alternate control diagram illustrating one or more feedback loops that may be utilized by a controller of the welding system of FIG. 1.

FIG. 5 is an embodiment of an alternate control diagram 158 illustrating exemplary control loops that may be utilized to coordinate control of a first motor assembly 160 and a second motor assembly 162. In this embodiment, in addition to the current feedback loops 126 and 150 and the speed feedback loops 128 and 152, each of the first assembly 160 and the second assembly 162 include a position feedback loop 164 and 166, respectively. Additionally, in this embodiment, the output position of the first motor, as opposed to the output speed of the first motor in the embodiment of FIG. 4, is the commanded position of the second motor, as opposed to the commanded speed of the second motor as in the embodiment of FIG. 4.

Specifically, in the embodiment illustrated in FIG. 5, the first motor assembly includes a position feedback point 168, a first position controller 170, the speed feedback point 110, the first speed controller 112, the current feedback point 114, the first torque controller 116, the first electrical system 118, the first mechanical system 120, and a first position calculation block 172. During operation, a first motor command 174 and positional feedback of the first motor output 176 are each input to the first position controller 170 via point 168. The positional feedback is determined by position sensor 178 by dividing the motor speed by time in position calculation block 172. The first position controller 170 is configured to compare the positional feedback from the position loop 164 to the first motor command 174 and, if necessary, to alter one or more control parameters of the motor operation to reduce or eliminate an error between the desired position command and the actual position feedback.

Similarly, the second motor assembly 162 includes a position feedback point 180, a second position controller 182, the speed feedback point 134, the second speed controller 136, the current feedback point 138, the second torque controller 140, the second electrical system 142, the second mechanical system 144, and a second position calculation block 184. During operation, a second motor command 186, which is equal to the positional output of the first motor 176, and positional feedback of the second motor output 188 are each input to the second position controller 182 via point 180. The positional feedback is determined by position sensor 190 by dividing the second motor speed by time in position calculation block 184. The second position controller 182 is configured to compare the positional feedback from the position loop 166 to the second motor command 186 and, if necessary, to alter one or more control parameters of the second motor operation to reduce or eliminate an error between the desired position command and the actual position feedback. That is, in the embodiment of FIG. 5, the second position controller 182 is configured to operate to reduce an error between the second motor command 186 and the second motor output 188. As such, the controller 182 operates to reduce or eliminate an error between the operational position of the first motor 176 and the operational position of the second motor 188.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding wire feed system, comprising:
a wire feeder comprising a push motor configured to establish a wire feed from a wire spool and a first controller configured to receive a commanded speed level and to control operation of the push motor based upon the commanded speed level; and
a welding torch assembly comprising a pull motor configured to cooperate with the push motor to establish a desired wire feed rate from the wire spool to the welding torch assembly and a second controller configured to receive an operational speed level of the push motor from the first controller, to set a commanded speed level for the pull motor approximately equal to the operational speed level of the push motor, and to control operation of the pull motor based upon the commanded speed level for the pull motor set by the second controller.

2. The welding wire feed system of claim 1, wherein the wire feeder comprises a tachometer coupled to the push motor and configured to measure a rotational speed of the shaft of the push motor.

3. The welding wire feed system of claim 2, wherein the first controller is configured to receive feedback from the tachometer regarding the operational speed of the push motor and to command a desired operational torque level of the push motor based on the operational speed feedback.

4. The welding wire feed system of claim 3, wherein the wire feeder comprises a current sensor coupled to the push motor and configured to measure a current level of the push motor that is indicative of an operational torque of the push motor.

5. The welding wire feed system of claim 4, wherein the first controller is configured to receive feedback from the current sensor and to command a desired torque level of the push motor based on the received feedback.

6. The welding wire feed system of claim 1, wherein the welding torch assembly comprises a tachometer and a current sensor coupled to the pull motor and configured to provide speed feedback and current feedback, respectively, to the second controller.

7. The welding wire feed system of claim 6, wherein the second controller is configured to regulate a torque level and a speed level of the pull motor based on the speed feedback and the current feedback.

8. A welding wire feed system, comprising:
   a welding wire feeder comprising a drive assembly, comprising:
      a push motor configured to power rotation of at least one drive roller to unspool wire from a wire spool; and
      a first controller coupled to the push motor and configured to control operation of the push motor to maintain a wire speed level resulting from rotation of the push motor at a commanded speed level by receiving feedback from a speed sensor and a current sensor each coupled to the push motor and configured to measure a rotational speed of the push motor or of a component coupled to the push motor and a current level of the push motor, respectively; and
   a welding torch assembly comprising:
      a pull motor configured to power rotation of at least one additional drive roller to establish a desired wire feed rate from the wire spool to the welding torch assembly;
      a second controller coupled to the pull motor and configured to receive an operational speed level of the push motor from the first controller and to control operation of the pull motor to maintain a wire drive speed level resulting from rotation of the pull motor approximately equal to the operational speed level of the push motor.

9. The welding wire feed system of claim 8, wherein the second controller is configured to control the pull motor by receiving feedback from a speed sensor and a current sensor each coupled to the pull motor and configured to measure a rotational speed of a shaft of the pull motor and a current level of the pull motor, respectively.

10. The welding wire feed system of claim 8, wherein the first controller is configured to receive feedback from the current sensor approximately 20 times more frequently than the first controller receives feedback from the speed sensor.

11. The welding wire feed system of claim 8, wherein the current sensor is a Hall sensor.

12. The welding wire feed system of claim 8, wherein the speed sensor is a tachometer.

13. The welding wire feed system of claim 8, further comprising a welding power supply comprising power conversion circuitry configured to receive primary power and to convert the primary power to a weld power output suitable for powering a welding operation and operation of the welding wire feeder.

* * * * *